J. H. DOWNIE.
CENTER FORMING DEVICE.
APPLICATION FILED SEPT. 15, 1919.

1,430,730.

Patented Oct. 3, 1922.

Inventor
J. H. Downie

Patented Oct. 3, 1922.

1,430,730

UNITED STATES PATENT OFFICE.

JAMES H. DOWNIE, OF SAN ANTONIO, TEXAS.

CENTER-FORMING DEVICE.

Application filed September 15, 1919. Serial No. 323,756.

*To all whom it may concern:*

Be it known that I, JAMES H. DOWNIE, a citizen of the United States, residing at San Antonio, in the county of Bexar, State of Texas, have invented certain new and useful Improvements in Center-Forming Devices; and I do hereby declare the following to be a full, clear, and exact description of the invention, such as will enable others skilled in the art to which it appertains to make and use the same.

This invention relates to centering machines; and the object of the same is to produce a machine by means of which the exact center in the end of a shaft or similar piece of rotating work can be found and turned so that the work can be subsequently put onto a lathe for turning.

In constructing a centering machine in accordance with the present invention, I provide a bed having ways similar to those of an ordinary turning lathe, at one end of which is a head stock having a chuck to receive the work to be centered.

I mount on the ways a work support similar to the well known universal chuck, but which does not rotate, the jaws of the chuck being adjusted to hold the work only with such pressure as to prevent chattering while permitting rotation of it. Upon the ways is mounted a carriage similar to the tail stock of a lathe and upon which is mounted a member that is adjustable transversely of the bed and which in turn carries a turret, the base of which is adjustable thereon longitudinally of the bed while the body of the turret is rotatably adjustable as is usual.

The turret is provided with three tools, of which the first one to be brought into action is a facing tool that faces the end of the work at right angles to its axis of rotation. The next tool is a grooving tool which when presented to the work, has its point eccentric to the axis of rotation of the work, so as to cut an annular groove concentric to the axis of rotation. The third tool is a stationary drill which is presented to the work with its axis alined with the axis of rotation of the work and which serves to cut out the material within the enclosure of the outer wall of the groove and which wall is, of course, concentric to the axis of rotation. The result is a conical bearing seat in the end of the work, the curved wall of which is concentric to the axis of rotation. The bearing seat thus provided is a true concentric seat whether or not the drill was presented concentric to the axis of rotation of the work.

Details of one manner of successfully carrying out this invention are set forth below, and reference is made to the drawings wherein—

Figure 1:
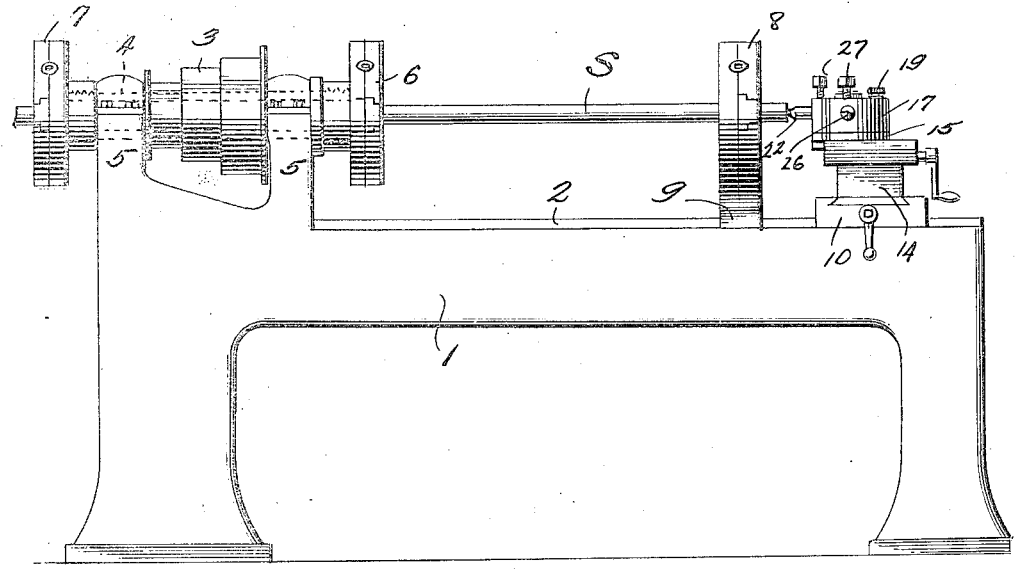
Figure 1 is a side elevation of this machine.

In the drawings, a machine is shown as having a bed 1 provided with ways 2, and power is communicated from a suitable source to the pulleys 3 fast on a tubular shaft 4 journaled in bearings 5 rising from said bed, the shaft carrying a chuck 6 by means of which the work is grasped and rotated. The work is here shown as a metal rod or shaft S, and if longer than illustrated in Figure 1 it could be extended through the tubular driving shaft and held in the left hand chuck C'. On the ways is mounted the base of a turret whose parts are adjustable transversely and longitudinally of the bed in the usual or any well known manner, and this turret carries the tools.

I prefer to guide the free end of the work S by a second chuck numbered 8, which is a non-revolving, universal, three-jawed structure whose jaws are simultaneously moved as usual by a mechanism not necessary to show and describe in detail. The support 9 for this chuck holds it upon and above the ways 2 so that its true axis is in exact alinement with the true axis of the driving chuck 6. The jaws in the latter are adjusted to grip one end of the work S, whereas the jaws in the chuck 8 are adjusted to a point where they serve as a guide for the other end of the work.

Figure 2:
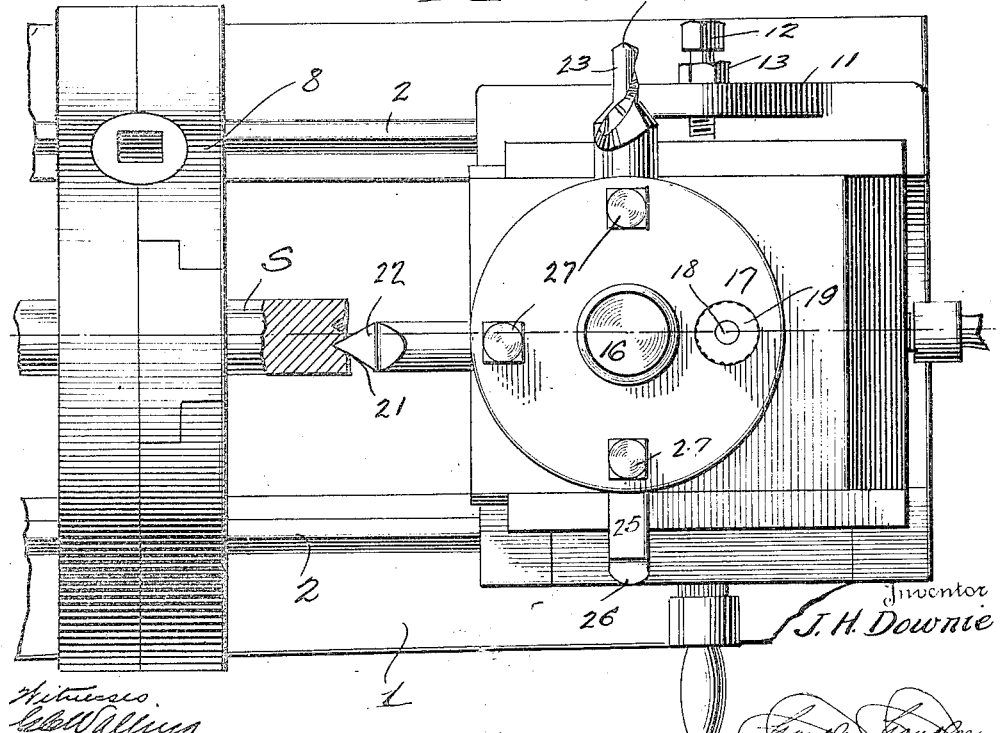
Figure 2 is a plan view of the right end of Figure 1 on a larger scale, showing the free end of the work in section.

The turret may be of any appropriate construction, its base 10 mounted on the ways of the bed B, and by preference this base has an upstanding lip 11 through which is passed a screw 12 held by a jam nut 13 and its tip serving as a stop to limit the transverse adjustment of the element 14. Upon the latter is longitudinally adjusted the element 15, and pivotally mounted on a post 16 rising from this element is a head 17 carrying the tools hereinafter described. By preference this head is circular as best seen in Figure 2, and is held in its adjusted positions by a spring bolt 18 whose tip engages the element 15 and whose upper end carries a handle or knob 19; and when this bolt is raised the head can be turned as desired. The adjustment of the stop 12 is only for the purpose of taking up wear, as the manual adjustment of the elements of the turret will be effected by any suitable means such as the cranks shown in Figure 1.

Mounted in and standing radial to the head 17 are three tools, one numbered 21 being the turning tool and having a V-shaped point 22, another numbered 23 being the finishing tool and having a rather blunt drill point 24, and a third being the facing tool 25 with a rounded point 26. These several tools may be mounted in the head in any suitable way, but are preferably held under set screws 27 as usual, and the finishing tool and facing tool are shown as diametrically opposite and standing on a strictly radial line through the center of the head, while the roughing tool 21 is shown as disposed between the other two and a little off a strict radial line which would pass from the center of the post 16 along the true axis of the work S as dotted in Figure 2. It will be understood that the element 15 is provided with sockets for the tip of the bolt 18 which are so located that the tool selected may be caused to project toward the work, which is to the left in both views.

Mounted in and standing radial to the head 17 are three tools of which the tool 25 has a rounded cutting end 26 and is designed for squaring up the end of the work to provide a flat face in which may be cut an annular groove in the manipulation of my apparatus. There is a second tool 21 having a V-shaped cutting point 22 while the third tool is shown at 23 and embodies a blunt drill point 24. These tools may be mounted in the head and held by set screws 27, after the manner of securing tools in the ordinary turret. The axes of the tools 23 and 25 aline and intersect the axis of rotation of the turret head while the axis of the tool 21 is slightly to one side of the axis of rotation of the turret head. It will be understood that the element 15 is provided with sockets for the tip of the bolt 18 so that the turret head may be held in its various adjusted positions.

In the use of the machine, a piece of work, which in the present instance is shown as a shaft S, is engaged at one end in the chuck 6 and is passed between the jaws of the positioning chuck 8, the jaws of which are then adjusted so as to hold the shaft against chattering but to permit of its rotation. The turret being then shifted to bring the facing tool with its axis parallel to the axis of rotation of the work, the tool is fed across the end of the shaft so as to give a flat face to facilitate subsequent operation of the tool 21. The turret is then shifted to the position shown in Figure 2 and is advanced to engage the point 22 of the tool 21 with the end face of the shaft at one side of its axis of rotation of the shaft. The point 22 being tapered, it cuts an annular groove in the end face of the shaft, illustrated in Figure 2, which groove is, of course, concentric with the axis of rotation of the shaft and which axis of rotation is approximately central to the periphery of the shaft by reason of the positioning chuck 8. This annular groove that the tool 21 cuts, has both its inner and outer walls tapered and when the tool becomes initially active, there is within the enclosure of the groove a resultant frusto-conical boss, which becomes first conical and then diminishes in altitude and base diameter as the tool advances. When the groove has been cut to the proper depth, at which time the altitude of the conical boss is materially less than the depth of the groove, the tool is withdrawn, the turret is rotated and there is advanced to the work, the drill 23. The axis of the drill intersects the axis of rotation of the turret and the drill engages the central boss and cuts it entirely away, the diameter of the drill being greater than the base diameter of the conical boss that has been left. The drill is then withdrawn and the result is a socket in the end of the work, every section through the wall of which socket in planes perpendicular to the axis of rotation of the work, is either a complete and true circle or is the arc of a true circle. It is, of course, understood that if the drill 23 has not been absolutely concentric to the annular groove, the inner end of the tapered socket is not in a plane at right angles to the axis of the socket, but on the contrary, is at a slight angle thereto. These complete circles or arcs, as the case may be, being of constantly decreasing radii inwardly of the socket, it will be understood that a bearing will be presented for the dead center of the lathe, which is shaped to correspond to the angularity of the wall of the socket.

It will further be understood that during the operation of the drill 23, if it be crowded slightly to one side when cutting away the material within the annular groove in the end of the work, it will make no difference, so long as the drill is not crowded sufficiently far to cut outside of the outer end portion of the wall of the groove. As above stated, it is only necessary that the outer end portion of the outer wall of the annular groove be left intact to provide the bearing for the dead center of the lathe.

What is claimed is:

1. A centering machine comprising a rotatable work holder and a turret having a groove forming tool disposed for presentation to work in the holder at one side of the axis of rotation of the holder and a boring tool having a radius greater than the eccentricity of the point of the groove forming tool to the said axis, the boring tool being positioned for alinement of its axis with that of rotation of the work holder in presentation of the boring tool to the work.

2. A centering tool comprising means for holding and rotating the work about an axis passing through it, a turret rotatable upon an axis in the plane of rotation of the axis of the work and at right angles to it, a grooving tool carried by the turret in position for presentation by the turret to the end face of the work and with the axis of the tool to one side of the axis of rotation of the work, and a drill carried by the turret for presentation thereby centrally of the work, the axis of the drill intersecting the axis of the turret at right angles, and the drill and grooving tool being movable with the turret to and from the work, the grooving tool being tapered forwardly, whereby to provide a conical cut.

In testimony whereof, I affix my signature, in the presence of two witnesses.

JAMES H. DOWNIE.

Witnesses:
E. IRVIN BURNS,
L. R. BEALOT.